United States Patent
Ramirez-Mendoza et al.

(10) Patent No.: US 11,292,724 B2
(45) Date of Patent: Apr. 5, 2022

(54) PROCESS FOR THE CONTINUOUS PREPARATION OF ZEOLITES USING ULTRASOUND

(71) Applicants: Arkema France, Colombes (FR); Katholieke Universiteit Leuven, Leuven (BE)

(72) Inventors: Heidy Ramirez-Mendoza, Lacq (FR); Serge Nicolas, Pau (FR); Cécile Lutz, Gan (FR); Jean-Luc Dubois, Millery (FR); Jeroen Jordens, Leuven (BE); Tom Van Gerven, Wijgmaal (BE)

(73) Assignees: Arkema France, Colombes (FR); Katholieke Universiteit Leuven, Leuven (BE)

(*) Notice: Subject to any disclaimer, the term of this patent is extended or adjusted under 35 U.S.C. 154(b) by 0 days.

(21) Appl. No.: 16/961,844

(22) PCT Filed: Jan. 11, 2019

(86) PCT No.: PCT/EP2019/050682
§ 371 (c)(1),
(2) Date: Jul. 13, 2020

(87) PCT Pub. No.: WO2019/138069
PCT Pub. Date: Jul. 18, 2019

(65) Prior Publication Data
US 2020/0385277 A1  Dec. 10, 2020

(30) Foreign Application Priority Data

Jan. 15, 2018 (FR) .................................... 1850299

(51) Int. Cl.
*C01B 39/22* (2006.01)

(52) U.S. Cl.
CPC .................................. *C01B 39/22* (2013.01)

(58) Field of Classification Search
CPC ......... B01J 37/343; C01B 39/22; C01B 39/46
See application file for complete search history.

(56) References Cited

U.S. PATENT DOCUMENTS

| | | |
|---|---|---|
| 4,314,979 A | 2/1982 | Deabriges |
| 4,661,334 A | 4/1987 | Latourrette et al. |
| 4,848,509 A | 7/1989 | Bruhnke et al. |

(Continued)

FOREIGN PATENT DOCUMENTS

| | | |
|---|---|---|
| BE | 869156 A | 1/1979 |
| CN | 103848436 A | 6/2014 |

(Continued)

OTHER PUBLICATIONS

Jingxi Ju, Cangfeng Zeng, Lixiong Zhang, Nanping Xu, Continuous synthesis of zeolite NaA in a microchannel reactor, Chemical Engineering Journal, vol. 116, Issue 2, (Year: 2006).*

(Continued)

*Primary Examiner* — Colin W. Slifka
(74) *Attorney, Agent, or Firm* — RatnerPrestia

(57) ABSTRACT

An intensified continuous process for synthesizing zeolite crystals is described, said process comprising a continuous supply of a continuously prepared gel, said gel then being continuously crystallized, said process comprising at least one application of ultrasound.

12 Claims, 1 Drawing Sheet

(56) References Cited

U.S. PATENT DOCUMENTS

| | | |
|---|---|---|
| 6,464,756 B1 | 10/2002 | Plee |
| 6,773,694 B1 | 8/2004 | Lesch et al. |
| 6,806,219 B2 | 10/2004 | Masini et al. |
| 2005/0250642 A1 | 11/2005 | Stamires et al. |

FOREIGN PATENT DOCUMENTS

| | | |
|---|---|---|
| CN | 105271298 A | 1/2016 |
| EP | 0149929 A1 | 7/1985 |
| EP | 1116691 A1 | 7/2001 |
| FR | 1357762 A | 4/1964 |
| FR | 2454997 A1 | 11/1980 |
| JP | 2003112918 A | 4/2003 |
| WO | 0117903 A1 | 3/2001 |
| WO | 2017216236 A1 | 12/2017 |

OTHER PUBLICATIONS

Kiss et al, "Ultrasound-assisted emerging technologies for chemical processes" Journal of Chemical Technology and Biotechnology, vol. 93, issue 5, pp. 1217-1227 First published: Dec. 27, 2017 (Year: 2017).*

Park, J., Kim, B.C., Park, S.S. et al. Conventional versus ultrasonic synthesis of zeolite 4A from kaolin. Journal of Materials Science Letters 20, 531-533 (2001). https://doi.org/10.1023/A:1010976416414 (Year: 2001).*

Andac et al., "Effects of ultrasound on zeolite A synthesis", Microporous and Mesoporous Materials, 79, (2005), 225-233.

Gielen et al., "Agglomeration Control during Ultrasonic Crystallization of an Active Pharmaceutical Ingredient", Crystals, (2017), 7, 40.

International Search Report and Written Opinion for International Application No. PCT/EP2019/050682, dated Mar. 4, 2019, 9 pages.

Ng et al., "Effects of ultrasonic irradiation on crystallization and structural properties of EMT-type zeolite nanocrystals", Materials Chemistry and Physics, 159, (2015), 38-45.

Wang, B., et al., "Synthesis of MCM-22 zeolite by an ultrasonic-assisted aging procedure," 2008, vol. 15, pp. 334-338, Ultrasonics Sonochemistry.

Abrishamkar, M., et al., Ultrasonic-Assistance and aging time effects on the zeolitation process of BZSM-5 zeolite, 2010, vol. 636, pp. 2686-2690, Z. Anorg. Allg. Chem.

Askari, S., et al., "Ultrasonic pretreatment for hydrothermal synthesis of SAPO-34 nanocrystals," 2012, vol. 19, pp. 554-559, Ultrasonics Sonochemistry.

Askari, S., et al., "Effects of ultrasound on the synthesis of zeolites" a review, 2013, vol. 20, pp. 285-302, Journal of Porous Materials.

Azizi, S.N., et al., Static and ultrasonic-assisted aging effects on the synthesis of analcime zeolite, 2010, vol. 636, pp. 886-890, Z. Anorg. Allg. Chem.

Jordens, J., et al., "Sonofragmentation: Effect of ultrasound frequency and power on particle breakage," 2016, pp. A-K, Crystal Growth & Design, American Chemical Society.

Ju, J., et al., "Continuous synthesis of zeolite NaA in a microchannel reactor," 2006, vol. 116, pp. 115-121, Chemical Engineering Journal.

Kim, Jong-Min, et al., "Acoustic influence on aggregation and agglomeration of crystals in reaction crystallization of cerium: carbonate," 2011, vol. 375, pp. 193-199, Colloids and Surfaces A: Physicochemical and Engineering Aspects.

Liu, Z., et al., "Ultrafast continuous-flow synthesis of crystalline microporous aluminophosphate $AlPO_4$-5," 2014, vol. 26, pp. 2327-2331, Chemistry of Materials.

Mu, Y et al., "Effect of ultrasound pretreatment on the hydrothermal synthesis of SSZ-13 zeolite," 2017, vol. 38, pp. 430-436, Ultrasonics—Sanochemistry.

Shumovskii, A.V., et al., "Continuous process for the production of zeolites in pulsation apparatus," 1995, vol. 31, Nos. 5-6, pp. 253-256, Chemical and Petroleum Engineering.

* cited by examiner

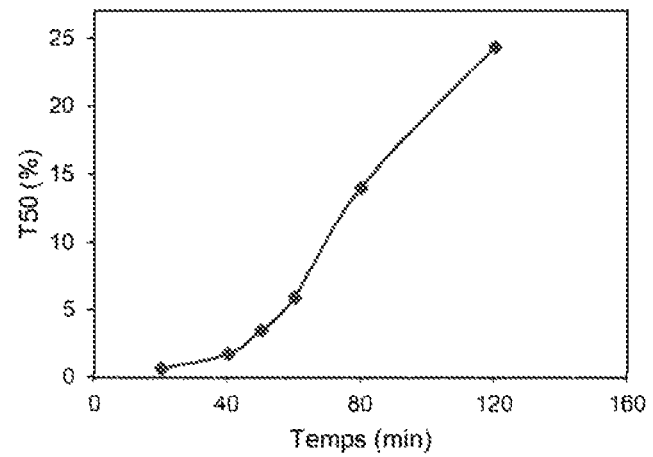
-- Figure 1 --
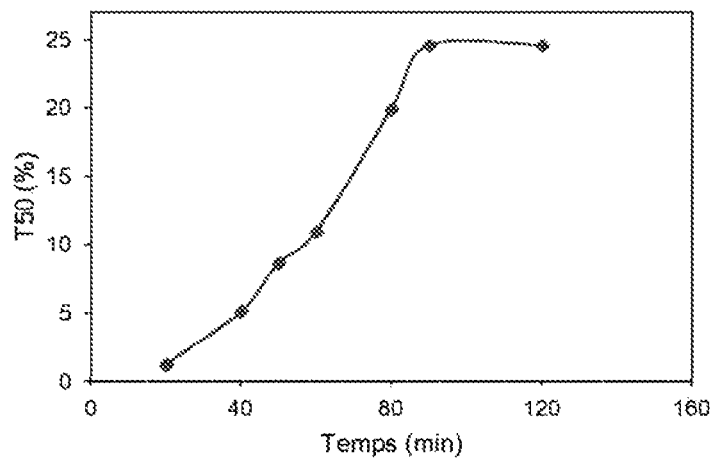
-- Figure 2 --

PROCESS FOR THE CONTINUOUS PREPARATION OF ZEOLITES USING ULTRASOUND

CROSS-REFERENCE TO RELATED APPLICATIONS

This is the national phase of International Application No. PCT/EP2019/050682, filed 11 Jan. 2019, which claims priority to French Application No. 1850299, filed 15 Jan. 2018. The disclosure of each of these applications is incorporated herein by reference in its entirety for all purposes.

The present invention relates to an intensified process for the continuous preparation of zeolite crystals of high crystallinity, of controlled size and with a low level of aggregation.

"Intensified process" means that the process implemented is:
- an accelerated process compared to the prior art (faster crystallisation) and/or
- a process allowing to reduce, or optionally to eliminate, a grinding step subsequent to the recovery of the solid (usually, grinding on the dried powder).

The synthesis of zeolite crystals (or more simply "zeolite synthesis" in the rest of this presentation) is carried out conventionally in industry in a stirred, large batch reactor, generally with heating of the synthesis and/or reaction medium gel by steam injection and/or by double jacket. The preparation of the synthetic gel consists in mixing a sodium aluminate solution with a sodium silicate solution, this mixture being able to be carried out either in an installation upstream of the crystallisation reactor or directly in the crystallisation reactor.

In order to improve the conventional process for crystallising zeolites in batch, studies have been published on the development of continuous synthesis processes. These works aim at overcoming or at least lessening the disadvantages related to batch processes and in particular reducing the size of the installations necessary for the synthesis, consequently reducing energy expenditure and improving the regularity of the quality of production.

Continuous synthesis processes are still little known today, and little used on the industrial level. However, some works describe processes called "continuous" processes for synthesising zeolites, which can be classified into three categories:
1) the synthesis medium is first prepared in a batch reactor in a conventional manner then this gel reservoir continuously supplies a crystallisation reactor; in this case, this is then referred to as a "semi-continuous" process since part of the process is carried out in a batch reactor (see for example Jingxi Ju and coil, "Continuous synthesis of zeolite NaA in a microchannel reactor", Chemical Engineering Journal, 116, (2006), 115-121; Shumovskii et al., "Continuous process for the production of zeolite in pulsation apparatus", Chemical and Petroleum Engineering, 31 (5-6), (1995), 253-256; Zhendong Liu et al., "Ultrafast Continuous-flow synthesis of crystalline microporous AlPO4-5", Chem. Mater., 2-7, (2014); U.S. Pat. No. 4,848,509 or else U.S. Pat. No. 6,773,694);
2) the synthesis medium is prepared continuously using a shearing mixer and then is crystallised in a batch reactor in a conventional manner (see for example documents EP0149929 and BE 869156);
3) the synthesis medium is prepared continuously and supplies a reactor continuously in order to carry out the crystallisation.

The first two categories are therefore not strictly speaking "continuous" processes since at least part of the synthesis is carried out in batch.

Among the works of the third category, it appears that the conditions for continuous synthesis are not always described very precisely, so that it is difficult, if not impossible to reproduce them. Particularly, the precise conditions for carrying out the process do not allow to know precisely which parameters are necessary to be applied in order to reduce the duration of crystallisation, or to accelerate crystallisation, to make crystallisation faster, to avoid as much as possible the formation of aggregates, while avoiding the formation of impurities, in particular unwanted crystalline phases.

Moreover, it is already known to use ultrasound to assist the synthesis of zeolite, in order to promote the formation of "nuclei" (germs) which will serve as primers for the growth of the solid. Ultrasound is used particularly for the phase called low-temperature ageing phase prior to crystallisation, which is carried out at a higher temperature.

The literature available on the subject, however, only relates to batch processes and ultrasound is applied only when cold (maximum temperature at 50° C.-70° C.), essentially on the mixture of reagents (synthesis gel) during the ageing phase. The application of ultrasound at higher temperature, for intensified processes for the continuous preparation of zeolites, that is to say where the nucleation rate must be as high as possible, is however neither described nor suggested in prior art.

Document CN103848436 describes a conventional synthesis of zeolite A, in batch, with a long ageing duration, greater than 20 hours, at 35-45° C. then crystallisation between 80 and 120° C. and sonication at 20-50 Hz for 10 to 30 minutes. The ageing time required in this synthesis makes this process incompatible with the economic requirements related to an industrial process. The application of ultrasound is presented in an optional washing step.

Document CN105271298, in turn, describes a process for upgrading coal gangue, composed of alumina and silica, which allows to crystallise an LTA type zeolite. In this process, a first heat treatment is necessary to "activate" the gangue which is then mixed with water under ultrasound irradiation. Then the reaction medium is subjected to an ageing step, then crystallisation takes place by heating the reaction medium. This process does not, however, correspond to an intensified process, within the meaning of the present invention, in particular due to the fact that the ultrasound irradiation step is implemented for the preparation of the activated gangue in an aqueous medium.

The works of Askari et al. summarise the effect of ultrasound on the synthesis of different types of zeolites in the article "*Effects of ultrasound on the synthesis of zeolites: a review*", J. Porous Mater., (2013), 20, 285-302. This article refers in particular to the references mentioned below, with the details of the operating conditions relating to ultrasound.

The article "*Effects of ultrasound on zeolite A synthesis*", Andac et al., Microporous and Mesoporous Materials, 79, (2005), 225-233, shows that the application of ultrasound at 35 kHz by plunging the synthesis reactor, in batch, in an ultrasonic bath during the ageing phase and the crystallisation phase, accelerates the synthesis of zeolite.

The article "*Synthesis of MCM-22 zeolite by an ultrasonic-assisted aging procedure*", Wang et al., Ultrasonics Sonochemistry, 15, (2008), 334-338, shows the benefits of exposure to ultrasound during the initial ageing of the synthesis gel of MCM-22 type zeolites prepared in batch, in particular in terms of reduction of the synthesis duration, reduction of the content of structuring agent required in the formulation and increase in the diversity of MCM-22 zeolites obtained.

In "*Ultrasonic-Assistance and Aging Time Effects on the Zeolitation Process of BZSM-5 Zeolite*", Abrishamkar et al., Z. Anorg. Allg. Chem., (2010), 636, 2686-2690, the ultrasound applied during the ageing step prior to crystallisation shortens the crystallisation duration of a BZSM-5 zeolite (ZSM-5 zeolite isomorphically substituted with boron) prepared in batch. Ultrasound is applied at a frequency of 40 kHz and a power of 50 W, at room temperature.

The article "*Static and Ultrasonic-assisted Aging Effects on the Synthesis of Analcime Zeolite*", Azizi et al., Z. Anorg. Allg. Chem., (2010), 636, 886-890, shows the advantage of subjecting the synthesis gel of analcime zeolite to ultrasound during the ageing phase to reduce the duration of crystallisation. The synthesis temperature is 25° C., and no indication concerning the ultrasonic bath is provided (frequency/power conditions). The batch synthesis duration is also completely incompatible with an economically feasible industrial synthesis.

The article "*Ultrasonic pretreatment for hydrothermal synthesis of SAPO-34 nanocrystals*", Askari et al., Ultrasonics Sonochemistry, 19, (2012), 554-559, describes the hydrothermal synthesis, in batch, of SAPO-34 nanocrystals assisted by ultrasound during the ageing phase (at a frequency of 24 kHz and at a temperature maintained at 50° C.).

Finally, the effect of ultrasound on the batch synthesis of EMT zeolite nanocrystals is studied as a function of time in the article "*Effects of ultrasonic irradiation on crystallization and structural properties of EMT-type zeolite nanocrystals*", Eng-Poh Ng et al., Materials Chemistry and Physics, 159, (2015), 38-45. The synthesis temperature is 25° C. and the ultrasound frequency applied is 47 kHz.

A similar teaching emerges from the article "*Effect of ultrasound pretreatment on the hydrothermal synthesis of SSZ-13 Zeolite*", Mu et al., Ultrasonics—Sonochemistry, 38, (2017), 430-436, for the batch synthesis of SSZ-13 zeolite. The ultrasonic bath is at a temperature of 35° C., and the frequency is fixed at 40 kHz.

All these techniques called batch techniques are however completely incompatible with an intensified, continuous process, one of the main criteria of which is the acceleration of the crystallisation rate. In order to accelerate the crystallisation rate to the maximum, one possibility consists in preparing the zeolite crystals at a temperature ideally higher than 70° C., preferably higher than 75° C., more preferably higher than 80° C. Under these conditions, the synthesis duration is reduced and allows access to a more economical preparation process.

The purpose of increasing the crystallisation temperature is to accelerate the growth kinetics of the crystals to decrease the duration of the crystallisation. The disadvantage of such crystallisation, known as "hot crystallisation", is that it remains difficult to carry out, and can, when it is improperly carried out, lead to a degradation of the crystallinity of the solid formed or a co-crystallisation of unwanted phases. The application of ultrasound to further improve this step therefore remains to be explored.

To further accelerate crystallisation, the technique of applying ultrasound remains to be explored. Indeed, ultrasound could improve the rate of material transport to the solid/liquid crystallisation interface by local agitation which is exacerbated in the reaction medium.

Moreover, it is known that a point of vigilance in the implementation of a continuous synthesis process containing solids (as is the case in the synthesis of zeolites) is the risk of fouling of reactors, which are generally and most often tubular reactors, by the accumulation of solids which can involve a drift in the process and high maintenance costs.

It is possible that if the continuous processes have not been particularly developed so far in the synthesis of zeolites, this is probably due in particular to the risk of fouling due to the presence of solids in the reaction medium (either amorphous solids present from the start in the synthesis gel, or crystalline solids at the end of the synthesis, after crystallisation), to the difficulties of reconciling crystallisation time and quality of the crystals formed. These difficulties can further be amplified during the synthesis of crystals of sizes greater than one hundred nanometres.

Some publications relate the application of ultrasound in order to simulate agitation of the reaction medium or else to disintegrate clusters of materials, crystal agglomerates and the like.

Thus, for example, "*Sonofragmentation: Effect of Ultrasound Frequency and Power on Particle Breakage*", Jordens et al., Cryst. Growth Des., (2016), 16(11), 6167-6177, reports the interest of fragmenting paracetamol crystals, in a liquid medium, using ultrasound under various conditions. However, it is not a question of deagglomeration of crystals, but of breakage of crystals which thus lose their integrity. This sonofragmentation treatment is implemented on previously isolated crystals, and therefore separately from the step of forming said crystals (crystallisation).

The works of J. M. Kim et al. ("*Acoustic influence on aggregation and agglomeration of crystals in reaction crystallization of cerium carbonate*", Colloids Surf. A Physicochem. Eng. Asp., (2011), 375, pp. 193-199), and of B. Gielen et al. ("*Agglomeration Control during Ultrasonic Crystallisation of an Active Pharmaceutical Ingredient*", Crystals, (2017), 7, 40) can also be mentioned, which are interested in the effects of sonication and ultrasound, in batch, on the agglomeration state of crystals of organic compounds or mineral salts.

Therefore, a need for an intensified process for the continuous preparation of highly crystalline zeolite crystals remains, said crystals having a controlled size and being poorly aggregated, said process further having good efficiency both economically and energetically, and particularly adapted to the industrial level.

Thus, the present invention relates to a continuously intensified process for the synthesis of zeolite crystals, said process comprising a continuous supply of a gel prepared continuously, said gel then being crystallised continuously, said process comprising at least one application of ultrasound.

In the process of the present invention, it should be understood that the gel crystallisation step is carried out continuously, that is to say without transient batch phase.

It has in fact been surprisingly discovered that the application of ultrasound during an intensified process for the continuous synthesis of zeolite crystals allows to obtain crystals of very high purity and/or to reduce, or optionally delete, a grinding step subsequent to the recovery of the solid (usually grinding on the dried powder) well known to the person skilled in the art.

The implementation of ultrasound thus allows to achieve an intensification of the process for the continuous synthesis of zeolites, which is efficient and economically sustainable from an industrial point of view, that is to say on a large scale, in order to be able to meet the zeolite needs of an ever growing market. Still other advantages will become apparent in light of the description of the invention that follows.

The process of the present invention allows in particular to synthesise very high purity zeolite crystals, that is to say having a purity equal to or greater than 95%, preferably equal to or greater than 98%, and preferably still comprised between 98% and 100%, as determined by quantitative XRD analysis.

The process according to the present invention generally allows the synthesis of zeolite crystals of granulometry (number average diameter determined by counting on SEM images) which can range from 0.05 µm to 20 µm, preferably from 0.1 µm to 20 µm, more preferably ranging from 0.2 µm to 10 µm, and more preferably from 0.3 µm to 8 µm, most preferably from 0.3 µm to 5 µm.

The aggregation of the crystals is evaluated by measuring the sizes using the granulometric analysis technique by laser diffraction with an apparatus of the Malvern Mastersizer 3000 type, as explained for example by Jordens et al., Ibid.

More specifically, the present invention relates to a process for the continuous preparation of zeolite crystals, comprising at least the following steps:
a) continuously supplying a composition capable of generating zeolite crystals;
b) continuously introducing said composition into at least one crystallisation reaction zone subjected to ultrasound, and
c) continuously recovering the crystals formed in step b).

"Composition capable of generating zeolite crystals" means within the meaning of the present invention, any type of composition well known to the person skilled in the art according to the type of zeolite to be prepared. Such a composition typically comprises at least one source of silica and at least one source of alumina and/or any other source of element(s) which may constitute a zeolitic framework, such as for example source of phosphorus, titanium, zirconium, and the like.

Preferably, the "composition capable of generating zeolite crystals" comprises a gel prepared continuously, as mentioned above. According to a very particularly advantageous embodiment of the present invention, the composition capable of generating zeolite crystals consists of the gel prepared continuously defined above.

Thus, the gel prepared continuously comprises at least one source of silica and one source of alumina and/or any other source of element(s) which may constitute a zeolitic framework, such as for example source of phosphorus, titanium, zirconium, and the like.

At least one aqueous solution of alkali or alkaline earth metal hydroxide, preferably of alkali metal, typically sodium and/or organic structuring agents ("structure-directing agent" or "template") can be optionally, but preferably, added to this composition.

"Source of silica" means any source well known to the person skilled in the art and in particular a solution, preferably aqueous solution, of silicate, in particular of alkali or alkaline earth metal silicate, for example sodium, or colloidal silica.

"Source of alumina" means any source of alumina well known to the person skilled in the art and in particular a solution, preferably aqueous solution, of aluminate, in particular of alkali or alkaline earth metal aluminate, for example sodium.

The concentrations of the various silica and alumina solutions are adapted according to the nature of the source of silica, of the source of alumina, of the respective proportions of the sources of alumina and of silica to which the alkali or alkaline earth metal hydroxide solution and/or one or more organic structuring agents, are added according to the knowledge of the person skilled in the art. In particular, information on the chemical nature of organic structuring agents to be optionally used depending on the zeolite to be synthesised can be found on the site of the "International Zeolite Association" (www.iza online.org), for example and in a non-exhaustive manner tetramethylammonium (TMA), tetra-n-propylammonium (TPA), methyltriethylammonium (MTEA).

The respective concentrations and proportions of the various silica and alumina solutions are known to the person skilled in the art or can be easily adapted by the person skilled in the art depending on the nature of the zeolite that it is desired to be prepared, based on literature data.

Thus, the intensification of the process results from the implementation of ultrasound, in other words the intensification of the process results from the application at one or more places along the continuous process, of ultrasound of well-defined frequency and power, the power and frequency can vary from one source of ultrasound to another, fulfilling one or more of the following purposes:
  accelerate the crystallisation rate (reduce the duration of crystallisation)
  disaggregate the crystal aggregates at the end of the synthesis, when the solid is still in suspension in the mother liquors (avoid or reduce the solid-state grinding phase)

Ultrasound is applied at least at one point in the continuous synthesis of zeolite crystals, for example in the crystallisation zone (to promote the formation of crystals) and/or in the end of synthesis zone (to disaggregate possible aggregates of crystals), but also in the ageing zone, etc.

Ultrasound can be applied in a continuous, or sequenced or alternated manner or a combination of these different methods.

The application of ultrasound in a liquid medium creates an acoustic cavitation. This acoustic cavitation in the liquid medium depends on a large number of sonochemical parameters (such as for example frequency, power, geometry of the reactor, and the like), and operating conditions (such as for example pressure, temperature, dissolved gas, and the like) which directly affect the sonochemical effects obtained.

Ultrasound is generally produced by a device called a transducer, in particular based on the properties of piezoelectric materials, which allows to convert electrical energy into mechanical energy. This mechanical vibration is transmitted in the reaction medium in the form of an acoustic wave. Piezoelectric transducers use the reverse piezoelectric effect of natural or synthetic single crystals like quartz or ceramics like barium titanate. These materials are easily machinable in the form of discs, plates or rings on the faces of which are fixed two metal electrodes. Thus, when an electrical voltage is applied to these electrodes, the material expands or compresses according to the orientation of the voltage relative to the polarisation of the material, for example ceramic.

Other types of ultrasound emissions are possible, for example from magnetostrictive transducers based on ferromagnetic materials placed under an alternating magnetic field. Furthermore, as the cavitation phenomenon can be induced by ultrasound, it can be considered that this phenomenon is induced by other techniques such as by hydrodynamic cavitation. Combinations of two or more of these techniques can of course be implemented in the process of the present invention.

Ultrasound apparatuses adapted for the needs of the invention can, for example, be selected from apparatuses with a transducer device, such as those sold for example by the company Weber-Ultrasonics under the names Sonopush® Duotransducer HD, Sonoplate Multi, Flow-Through Cell, or else those sold by the Hielscher Company, for example the UP200S, to name a few of them, without however being limiting.

The frequency of applied ultrasound depends largely on the desired effect and the nature of the medium to which they are applied. This frequency is generally comprised between 10 kHz and 5 MHz, preferably between 10 kHz and 1.5 MHz, more preferably between 15 kHz and 1 MHz, in a very particularly preferred manner between 15 kHz and 500 kHz, typically between 15 kHz and 200 kHz.

Similarly, the acoustic power of the ultrasound which is dissipated in the medium depends largely on the desired effect and on the nature of the medium to which the ultrasound is applied. This acoustic power is directly related to the electric power supplied by the generator. The electrical power supplied by the generator is generally comprised between 3 W and 500 W, preferably between 5 W and 400 W, more preferably between 8 W and 300 W.

According to a preferred embodiment, and when the desired effect is the reduction of the duration of the synthesis, the ultrasound applied is with relatively low powers, typically of powers less than 100 W. In this case, the size of the crystals (number average diameter) tends to decrease as the power of the applied ultrasound increases. According to another preferred embodiment, and when the desired effect and the disintegration of crystals, the ultrasound applied is with higher powers, typically powers greater than 100 W. In this case, the size of the agglomerates decreases with the power of applied ultrasound.

Likewise, the time of exposure to ultrasound of the continuous synthesis medium can vary within wide proportions depending on the desired effect, depending on the nature of the reaction medium and the like. Thus, and according to a preferred embodiment of the process according to the present invention, the fraction of the time of exposure to ultrasound relative to the time of residence of the reaction medium in the continuous reactor is comprised between 0.05% and 50%, preferably between 0.1% and 30%, more preferably 0.1% and 20%, better still between 0.1% and 10%, limits included.

As indicated above, the ultrasound can be applied continuously, in a sequenced or alternating manner, the continuous application at one or more points throughout the continuous synthesis process being however preferred. All other combinations of ultrasound applications, with variations in application time and/or frequency variations, or else power variations are of course possible and within the reach of the person skilled in the art. Thus, the duration of exposure to ultrasound, as well as the power of the ultrasound applied per unit volume of gel, have an influence on the kinetics of crystallisation and on the disintegration of the zeolite crystals. Crystals tend to form faster as the exposure time and/or applied power increases. Likewise, the disintegration of the crystals is greater when the duration of exposure and/or the power applied increase.

The process of the present invention can be carried out at any temperature that a person skilled in the art will be able to adapt according to the type of zeolite to be produced and the degree of intensification of the desired process. According to a preferred embodiment, the process according to the invention is carried out at a temperature comprised between 70° C. and 180° C., preferably between 75° C. and 160° C., more preferably between 80° C. and 140° C.

At temperatures below 60° C., the process will be too slow for the needs of an intensive industrial process, so that temperatures above 60° C., or even above 70° C., and even above 80° C. are particularly appropriate. Reaction temperatures even higher than 180° C. could theoretically be applied, the industrial process could however under such conditions be considered unprofitable.

According to a very particularly preferred aspect of the present invention, the reaction temperature can be advantageously fixed between 75° C. and 180° C., preferably between 80° C. and 140° C. to obtain an optimal compromise between degree of intensification of the process and purity of the crystals obtained.

The process of the present invention may optionally comprise one or more steps of adding seed(s) to the reaction medium.

The addition of seed to the synthesis medium allows to obtain even greater kinetics of crystallisation to be compatible with the constraints of a continuous process. The addition(s) of seed(s) can be made by any means known to the person skilled in the art and for example using a static mixer which has the advantage of promoting the homogenisation of the synthesis medium/seed mixture. Seed (also called "seeding agent") means a solid or a liquid which promotes the orientation of the synthesis towards the desired zeolite.

In a particularly advantageous embodiment, the method of the invention comprises adding, in one or more times, before, after or during the crystallisation step, one or more seeding agents. This addition of seeding agent(s) in particular allows to significantly speed up the crystallisation step.

Seeding agent (or seed) means a solution or a suspension, in liquid form or in gel form, of a solid or a liquid which promotes the orientation of the synthesis towards the desired zeolite. The seeding agents are well known to the person skilled in the art and are for example selected from nucleating gels, zeolite crystals, mineral particles of all kinds, and the like, as well as mixtures thereof.

According to a preferred aspect, the seeding agent is a nucleation gel and more preferably, said nucleation gel comprises a homogeneous mixture of a source of silica (for example sodium silicate), a source of alumina (for example alumina trihydrate), optionally but advantageously a strong mineral base, such as for example sodium, potassium, or calcium hydroxide to name only the main and most commonly used, and water. One or more structuring agents, typically organic structuring agents, can also optionally be introduced into the nucleation gel.

Thus, the application of ultrasound in the process for the continuous preparation of zeolite crystals allows a substantial intensification of this continuous synthesis, allowing shorter synthesis durations and also reduced energy consumption.

Furthermore, and if desired, the method of the invention may comprise a step allowing the elimination or at least the reduction of the post-grinding step by ultrasound irradiation at the end of synthesis, where the crystals are usually "dry" ground after filtration and drying, the drying step having the effect of making the aggregates more resistant, therefore more difficult to dislocate. The application of ultrasound according to the process of the present invention makes the disintegration possible in a humid medium, before separation of the mother liquors, which allows to reduce the overall energy balance of the process.

It has further been discovered quite surprisingly, in the continuous process of the present invention, that the application of ultrasound also allows to reduce or even eliminate any risk of fouling of the system. The use of ultrasound consequently makes it even easier to prepare zeolite crystals continuously, in an industrial manner. Thus, the process of the present invention allows to propose an industrial process which benefits from the advantages of the continuous synthesis by minimising or even eliminating the problems related to fouling of the installations.

In general, the process of the present invention allows the preparation of any type of zeolite known to the person skilled in the art and for example, and without limitation, any MFI type zeolite, and in particular silicalite, any zeolite of the MOR type, OFF type, MAZ type, CHA type and HEU type, any FAU type zeolite, and in particular Y zeolite, X zeolite, MSX zeolite, LSX zeolite, any EMT type zeolite or any LTA type zeolite, that is to say A zeolite, as well as the other zeotypes, such as for example the titanosilicalites.

MSX zeolite (Medium Silica X) means an FAU type zeolite having an Si/Al atomic ratio comprised between approximately 1.05 and approximately 1.15, limits included. LSX zeolite (Low Silica X) means an FAU type zeolite having an Si/Al atomic ratio equal to approximately The method according to the invention is particularly adapted for the preparation of zeolites selected from zeolites of the MFI type, and in particular silicalite, of the FAU type, and in particular Y zeolite, X zeolite, MSX zeolite, LSX zeolite, and of the LTA type, that is to say of A zeolite, as well as zeolites of CHA type and zeolites of HEU type.

The method according to the invention is further very particularly adapted for the preparation of any FAU type zeolite, and in particular X zeolite, MSX zeolite, LSX zeolite. MFI type zeolites, and in particular silicalite, can also be very advantageously prepared according to the process of the invention.

Furthermore, the continuous preparation process of the present invention is not limited to the preparation of the zeolites described above, but also includes the corresponding zeolites with hierarchical porosity. Zeolites with hierarchical porosity are solids, well known to the person skilled in the art, including a microporous network linked to a network of mesopores, and thus allow to reconcile the properties of accessibility to the active sites of mesoporous zeolites known in the prior art and those of maximum crystallinity and microporosity of zeolites called "conventional" zeolites (without mesoporosity). For the synthesis of such zeolites with hierarchical porosity, use is generally made of specific agents called structuring agents which are introduced into the synthesis medium, for example structuring agents of organosilane type, as for example described in document FR1357762.

According to another aspect, the present invention relates to the use of ultrasound, during the continuous synthesis of zeolite crystals at a reaction temperature comprised between 70° C. and 180° C., preferably between 75° C. and 160° C., more preferably between 80° C. and 140° C., said ultrasound being used at a frequency comprised between 10 kHz and 5 MHz, preferably between 10 kHz and 1.5 MHz, more preferably between 15 kHz and 1 MHz, in a very particularly preferred manner between 15 kHz and 500 kHz, typically between 15 kHz and 200 kHz.

The following examples illustrate the invention without however limiting the scope defined by the claims appended to the description of the present invention.

Characterisation Techniques
Qualitative and Quantitative Analysis by X-Ray Diffraction (XRD)

The purity of the synthesised zeolite crystals is evaluated by X-ray diffraction analysis, known to the person skilled in the art under the acronym XRD. This identification is carried out on an XRD apparatus of the Bruker brand.

This analysis allows to identify the various zeolites present in the adsorbent material because each of the zeolites has a unique diffractogram defined by the positioning of the diffraction peaks and by their relative intensities.

The zeolite crystals are ground then spread and smoothed on a sample holder by simple mechanical compression.

The conditions for acquiring the diffractogram produced on the Bruker D5000 apparatus are as follows:
Cu tube used at 40 kV-30 mA;
size of the (divergent, diffusion and analysis) slits=0.6 mm;
filter: Ni;
rotating sample device: 15 rpm$^{-1}$;
measurement range: $3°<2\theta°<50°$;
pitch: 0.02°;
counting time per pitch: 2 seconds.

The interpretation of the diffractogram obtained is carried out with the EVA software with identification of the zeolites using the ICDD PDF-2 database, release 2011.

The amount of crystals, by weight, is determined by XRD analysis, this method is also used to measure the amount of the non-crystalline phases. This analysis is carried out on an apparatus of the Bruker brand, then the amount by weight of the zeolite crystals is evaluated using the TOPAS software from the company Bruker. Purity is expressed as a weight percentage of desired crystalline phase relative to the total weight of the sample.

Analysis of Crystallinity

The crystallinity of the zeolite crystals is estimated by conventional methods such as measurements of Dubinin volumes (adsorption of liquid nitrogen at 77 K), or the toluene adsorption indices (toluene adsorption capacities at a relative pressure of 0.5 at 25° C. after an exposure of 2 hours, as described in patent application EP1116691 A or U.S. Pat. No. 6,464,756 B).

EXAMPLE 1: CONTINUOUS PROCESS WITHOUT ULTRASOUND AT 80° C.

X zeolite crystals in sodium form (NaX) are prepared from solutions of sodium aluminosilicate and sodium silicate, with a step of adding a seeding agent. Thus, 100 ml of reaction medium are prepared by mixing the solutions of sodium silicate and sodium aluminosilicate at 80° C. in a mixer with a high shear rate.

The crystallisation takes place at 80° C. for 2 hours, by circulating the reaction medium with a flowrate of 60 ml·min$^{-1}$ to pass it through a tubular reactor of 0.5 cm in diameter and 22.5 cm in length, said reactor being equipped with a plate transducer located outside the tube, but which remains inactive for this example.

EXAMPLE 2: CONTINUOUS PROCESS WITH ULTRASOUND AT 80° C.

Crystals of X zeolite in sodium form (NaX) are prepared from solutions of sodium aluminosilicate and sodium silicate, with a step of adding a seeding agent. As in the previous example, 100 ml of reaction medium are prepared by mixing the solutions of sodium silicate and sodium aluminosilicate at 80° C. in a mixer with high shear rate.

The crystallisation takes place at 80° C. for 2 hours, by circulating the reaction medium with a flowrate of 60 ml·min$^{-1}$ to pass it through a tubular reactor of 0.5 cm in diameter and 22.5 cm in length which is, for the purposes of this example, exposed to ultrasound generated using the plate transducer whose frequency is equal to 34.5 kHz. The electrical power of the generator is fixed at 40 W.

Ultrasound is applied continuously only at the tubular reactor, which corresponds to a continuous circulation of the synthesis gel with an ultrasound point irradiation.

FIGS. 1 and 2 show that in the absence of ultrasound, the zeolite crystals allowing to reach an adsorption of toluene (T50) of approximately 24% are obtained after 120 minutes (Example 1, FIG. 1). With the application of ultrasound (Example 2, FIG. 2), the zeolite crystals allowing to reach an adsorption of toluene (T50) of about 24% are obtained as early as 80 minutes, which demonstrates the great interest of the use of ultrasound for the intensified process for the continuous preparation of zeolite crystals according to the present invention. It is therefore observed that the synthesis duration can be greatly reduced (⅓ less time in Example 2) by application of ultrasound, without degradation of the adsorption properties of the zeolite obtained. This corresponds to an intensification of the continuous process for preparing zeolites.

The invention claimed is:

1. An intensified, continuous process for synthesizing zeolite crystals, the process comprising:
   continuously supplying a composition capable of generating zeolite crystals, where the composition is prepared continuously,
   the composition then being crystallised continuously to zeolite crystals, wherein the process comprises at least one application of ultrasound having a frequency between 10 kHz and 5 MHz,
   and wherein the temperature during the process is between 75 and 180° C.

2. The process according to claim 1, comprising at least the following steps:
   a) continuously supplying the composition, where the composition is present in a reaction medium;
   b) continuously introducing the composition into at least one crystallisation reaction zone subjected to ultrasound, and
   c) continuously recovering the zeolite crystals formed in step b).

3. The process according to claim 2, wherein the time of exposure of the composition to ultrasound relative to the time of residence of the composition in the reaction medium in a continuous reactor is between 0.05% and 50%.

4. The process according to claim 2, further comprising one or more steps of adding seed(s) to the reaction medium.

5. The process according to claim 1, wherein the frequency of the applied ultrasound is between 10 kHz and 1.5 MHz.

6. The process according to claim 1, wherein the ultrasound is produced by an ultrasound generator, wherein the ultrasound generator supplies electric power between 3 W and 500 W.

7. The process according to claim 1, wherein the temperature is between 75° C. and 160° C.

8. The process according to claim 1, further comprising a step of applying ultrasound irradiation at the end of the process before separation of the zeolite crystals from the mother liquor.

9. The process according to claim 1, wherein the zeolite crystals prepared are zeolite crystals selected from MFI type zeolites, MOR type zeolites, OFF type zeolites, MAZ type zeolites, CHA type zeolites, HEU type zeolites, FAU type zeolites, EMT type zeolites, LTA type zeolites, and titanosilicalites.

10. The process according to claim 1, wherein the zeolite crystals prepared are zeolite crystals selected from X zeolite, MSX zeolite and LSX zeolite.

11. The process according to claim 1, wherein the zeolite crystals prepared are zeolite crystals with hierarchical porosity.

12. A process of applying ultrasound at a frequency between 10 kHz and 5 MHz during the continuous synthesis of zeolite crystals at a reaction temperature between 75° C. and 180° C.

* * * * *